(12) United States Patent
Daffer

(10) Patent No.: US 12,491,109 B2
(45) Date of Patent: *Dec. 9, 2025

(54) HYPERTHERMIC CONDITIONING CAPSULE

(71) Applicant: Visibelle Derma Institute, Inc., Bloomington, MN (US)

(72) Inventor: Steven J. Daffer, Edina, MN (US)

(73) Assignee: VISIBELLE DERMA INSTITUTE, INC., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,645

(22) Filed: Mar. 25, 2022

(65) Prior Publication Data

US 2022/0218515 A1    Jul. 14, 2022

Related U.S. Application Data

(63) Continuation of application No. 16/010,927, filed on Jun. 18, 2018, now Pat. No. 11,311,410.
(Continued)

(51) Int. Cl.
*A61B 5/00* (2006.01)
*A61F 7/00* (2006.01)
(Continued)

(52) U.S. Cl.
CPC .......... *A61F 7/0053* (2013.01); *A61F 7/0085* (2013.01); *A61M 19/00* (2013.01);
(Continued)

(58) Field of Classification Search
USPC .............................................. 607/77; 600/21
See application file for complete search history.

(56) References Cited

U.S. PATENT DOCUMENTS

| 1,221,163 A | 4/1917 | Frink |
| 1,643,528 A | 9/1927 | Thurston |
| (Continued) | | |

FOREIGN PATENT DOCUMENTS

| DE | 725804 | 3/1944 |
| DE | 3915008 A1 | 11/1990 |
| (Continued) | | |

OTHER PUBLICATIONS

Prosecution History from U.S. Appl. No. 12/396,847, filed Mar. 3, 2009 including: Notice of Allowance and Fee(s) Due mailed Sep. 5, 2017, Non-Final Rejection mailed Nov. 21, 2016, Final Rejection mailed Oct. 6, 2014, Non-Final Rejection mailed Dec. 23, 2013, Final Rejection mailed Feb. 9, 2012, and Non-Final Rejection mailed Aug. 4, 2011.

(Continued)

*Primary Examiner* — Niketa Patel
*Assistant Examiner* — Anant A Gupta
(74) *Attorney, Agent, or Firm* — Westman, Champlin & Koehler, P.A.

(57) ABSTRACT

A self-contained, hyperthermic conditioning unit and selectively controllable environment for exercising. The unit comprises a base portion having a bed therein and a removable cover connected to the base portion to enclose a personal compartment within the unit. One or more heating elements provide heat to the personal compartment and one more pieces of physical exercise equipment are provided within the personal compartment.

26 Claims, 5 Drawing Sheets

Related U.S. Application Data

(60) Provisional application No. 62/521,802, filed on Jun. 19, 2017.

(51) Int. Cl.

| | | |
|---|---|---|
| *A61M 19/00* | (2006.01) | |
| *A61M 21/00* | (2006.01) | |
| *A61N 5/06* | (2006.01) | |
| *A63B 21/00* | (2006.01) | |
| *A63B 21/002* | (2006.01) | |
| *A63B 21/055* | (2006.01) | |
| *A63B 21/062* | (2006.01) | |
| *A63B 21/065* | (2006.01) | |
| *A63B 22/04* | (2006.01) | |
| *A63B 22/06* | (2006.01) | |
| *A63B 71/04* | (2006.01) | |
| *A61M 11/00* | (2006.01) | |
| *A61N 5/00* | (2006.01) | |

(52) U.S. Cl.
CPC ....... *A61M 21/0094* (2013.01); *A61N 5/0625* (2013.01); *A63B 21/0023* (2013.01); *A63B 21/0552* (2013.01); *A63B 21/0628* (2015.10); *A63B 21/065* (2013.01); *A63B 21/4013* (2015.10); *A63B 21/4021* (2015.10); *A63B 21/4034* (2015.10); *A63B 21/4035* (2015.10); *A63B 22/04* (2013.01); *A63B 22/0605* (2013.01); *A63B 71/04* (2013.01); *A61F 2007/0052* (2013.01); *A61F 2007/0055* (2013.01); *A61F 2007/0057* (2013.01); *A61F 2007/0064* (2013.01); *A61F 2007/0086* (2013.01); *A61F 2007/0093* (2013.01); *A61F 2007/0096* (2013.01); *A61M 11/00* (2013.01); *A61M 2021/0027* (2013.01); *A61M 2021/0044* (2013.01); *A61M 2021/0055* (2013.01); *A61M 2021/0066* (2013.01); *A61M 2021/0072* (2013.01); *A61M 2202/0208* (2013.01); *A61M 2205/051* (2013.01); *A61M 2205/056* (2013.01); *A61M 2205/3368* (2013.01); *A61M 2205/3606* (2013.01); *A61M 2205/3646* (2013.01); *A61M 2205/368* (2013.01); *A61M 2230/06* (2013.01); *A61M 2230/205* (2013.01); *A61M 2230/30* (2013.01); *A61M 2230/50* (2013.01); *A61N 2005/007* (2013.01); *A61N 2005/0637* (2013.01); *A61N 2005/0652* (2013.01); *A61N 2005/0659* (2013.01); *A63B 2208/0252* (2013.01); *A63B 2209/00* (2013.01); *A63B 2213/002* (2013.01); *A63B 2213/005* (2013.01)

(56) References Cited

U.S. PATENT DOCUMENTS

| | | | |
|---|---|---|---|
| 1,797,916 A | 3/1931 | Kruse | |
| 2,012,221 A | 8/1935 | Clark et al. | |
| 2,096,128 A | 10/1937 | Mortrude, Jr. | |
| 2,240,819 A | 5/1941 | Waly | |
| 2,300,455 A | 11/1942 | Lukats | |
| 2,567,614 A | 9/1951 | Merriam | |
| D189,951 S | 3/1961 | Cosper | |
| 3,409,915 A * | 11/1968 | Gregoire | A61H 33/06 |
| | | | 4/528 |
| 3,772,713 A | 11/1973 | Roullier | |
| 3,945,058 A | 3/1976 | Gardner | |
| 4,031,573 A | 6/1977 | Romanoff | |
| 4,055,863 A | 11/1977 | Duval | |
| D249,894 S | 10/1978 | Brancaccio et al. | |
| 4,130,120 A | 12/1978 | Kohler, Jr. | |
| D255,491 S | 6/1980 | Brancaccio et al. | |
| 4,258,706 A | 3/1981 | Shank | |
| 4,277,855 A | 7/1981 | Poss | |
| 4,389,066 A * | 6/1983 | Weir | A61G 1/007 |
| | | | 5/629 |
| D275,605 S | 9/1984 | Taylor | |
| 4,565,188 A | 1/1986 | Hardie | |
| 4,671,284 A | 6/1987 | Wilson et al. | |
| 4,712,538 A | 12/1987 | Hardie et al. | |
| D297,863 S | 9/1988 | Hardie et al. | |
| 4,833,739 A | 5/1989 | Sakakibara et al. | |
| 4,862,526 A | 9/1989 | Berger | |
| 4,884,574 A | 12/1989 | Hardie et al. | |
| D317,650 S | 6/1991 | Soder | |
| 5,101,809 A | 4/1992 | Daffer et al. | |
| D326,720 S | 6/1992 | Garrison et al. | |
| 5,228,150 A | 7/1993 | Parker | |
| 5,255,399 A | 10/1993 | Park | |
| D340,992 S | 11/1993 | Garrison | |
| 5,416,931 A | 5/1995 | Wolfenden et al. | |
| D360,469 S | 7/1995 | Panelli et al. | |
| 5,441,529 A | 8/1995 | Dorsch | |
| 5,511,254 A | 4/1996 | O'Brien | |
| 5,546,678 A | 8/1996 | Dhaemers | |
| D377,530 S | 1/1997 | Daffer et al. | |
| 5,645,578 A | 7/1997 | Daffer et al. | |
| D384,416 S | 9/1997 | Daffer et al. | |
| 5,683,437 A | 11/1997 | Doty | |
| 5,891,186 A * | 4/1999 | Daffer | A61H 23/02 |
| | | | 600/27 |
| D413,388 S | 8/1999 | Daffer et al. | |
| 6,004,344 A | 12/1999 | Fujii | |
| 6,066,087 A * | 5/2000 | Tron | A61H 33/06 |
| | | | 601/24 |
| D453,834 S | 2/2002 | Daffer et al. | |
| 6,350,275 B1 | 2/2002 | Vreman et al. | |
| 6,497,717 B1 * | 12/2002 | Daffer | A61H 33/06 |
| | | | 607/81 |
| 6,623,511 B1 * | 9/2003 | Daffer | A61M 21/0094 |
| | | | 607/81 |
| 7,282,060 B2 | 10/2007 | DeBenedictis et al. | |
| 7,461,797 B2 | 12/2008 | Bhat | |
| 7,526,344 B2 | 4/2009 | Kim | |
| 9,808,644 B2 | 11/2017 | Daffer | |
| 10,744,340 B2 | 8/2020 | Daffer | |
| 11,311,410 B2 * | 4/2022 | Daffer | A63B 21/0552 |
| 11,504,544 B2 | 11/2022 | Daffer | |
| 2002/0162560 A1 * | 11/2002 | Rogacki | A61M 15/00 |
| | | | 128/898 |
| 2002/0198575 A1 | 12/2002 | Sullivan | |
| 2003/0089370 A1 * | 5/2003 | Daffer | A61H 35/00 |
| | | | 128/201.24 |
| 2004/0260364 A1 * | 12/2004 | Daffer | A61H 9/00 |
| | | | 607/81 |
| 2006/0200211 A1 | 9/2006 | Lin | |
| 2006/0253175 A1 | 11/2006 | Fan et al. | |
| 2007/0088410 A1 | 4/2007 | Chung et al. | |
| 2007/0282400 A1 | 12/2007 | Gorham | |
| 2009/0216299 A1 | 8/2009 | Dantus | |
| 2009/0216302 A1 | 8/2009 | Smolka | |
| 2009/0222070 A1 | 9/2009 | Daffer | |
| 2010/0049282 A1 | 2/2010 | Wang | |
| 2010/0063487 A1 | 3/2010 | Straalen | |
| 2016/0051847 A1 * | 2/2016 | Zhang | A63B 24/0087 |
| | | | 128/202.13 |
| 2016/0256706 A1 * | 9/2016 | Harrison | A61N 1/36003 |
| 2018/0056111 A1 * | 3/2018 | Chiang | A63B 71/0619 |
| 2020/0330787 A1 | 10/2020 | Daffer | |

FOREIGN PATENT DOCUMENTS

| | | |
|---|---|---|
| EP | 0986985 A1 | 3/2000 |
| FR | 2086905 A5 | 12/1971 |
| FR | 2629343 A1 | 10/1989 |
| FR | 2803512 A1 | 7/2001 |
| GB | 1490381 | 11/1977 |
| JP | 8112302 A | 5/1996 |
| JP | 11114008 A | 4/1999 |

(56) References Cited

FOREIGN PATENT DOCUMENTS

| | | |
|---|---|---|
| WO | 0002491 A1 | 1/2000 |
| WO | 03034971 A2 | 5/2003 |
| WO | 2006108093 A2 | 10/2006 |
| WO | 2007036002 A1 | 4/2007 |

OTHER PUBLICATIONS

Prosecution History from U.S. Appl. No. 15/796,141, filed Oct. 27, 2017 including: Notice of Allowance and Fee(s) Due mailed Apr. 9, 2020 and Non-Final Rejection mailed Dec. 23, 2019.
Prosecution History for corresponding U.S. Appl. No. 16/010,927, filed Jun. 18, 2018 including: Notice of Allowance and Fee(s) Due mailed Jan. 3, 2022, Final Rejection mailed Aug. 19, 2021, Non-Final Rejection mailed Jan. 19, 2021, Final Rejection mailed Jun. 18, 2020; and Non-Final Rejection mailed Feb. 20, 2020.
Chinese First Correction Notice dated Apr. 8, 2019 for corresponding Chinese Application No. 201820946569.0, filed Jun. 19, 2018.
Non-Final Rejection from U.S. Appl. No. 16/922,510, filed Jul. 7, 2020.
Prosecution History from U.S. Appl. No. 16/922,510 including Notice of Allowance dated Jul. 19, 2022; Final Office Action dated May 2, 2022 and Office Action dated Dec. 17, 2021.

\* cited by examiner

HYPERTHERMIC CONDITIONING CAPSULE

CROSS-REFERENCE TO RELATED APPLICATION

The present application is a continuation of U.S. patent application Ser. No. 16/010,927, filed Jun. 18, 2018; which is based on and claims the benefit of U.S. provisional patent application Ser. No. 62/521,802, filed Jun. 19, 2017, the contents of which are hereby incorporated by reference in their entirety.

BACKGROUND

The present disclosure relates to an individual capsule in which a person can lie in for various treatments. The capsule includes the ability to provide a hyperthermic conditioning environment by providing a heated capsule. The capsule may have exercise equipment therein for use in a temperature controlled environment.

In the prior art, various environmental capsules have been advanced, including for example, the structure shown in U.S. Pat. Nos. 5,101,809 and 6,497,717. The treatments that are present in the prior art devices include steam therapy, heat therapy, infrared heat and light exposure, pleasing sound sources, aroma therapy and some capsules provide a shower mounted in the cover or base of the capsule.

The capsules generally have a base that is large enough to accommodate a support or bed in a lower portion, and a hinged cover that can be opened so that a person can get in and out of the lower part or base of the capsule. The cover usually has individual controls to provide therapy source such as a shower, heat, steam, sound, aroma or other therapy source can be mounted in a position where a person lying on the bed can reach and operate the controls. In addition, it has long been known to have a vibrator on the bed to provide a relaxing, massage type vibration.

SUMMARY

The present disclosure relates to a self-contained, personal exercise unit where conditions such as temperature can be selectively controlled to provide one or more controllable environments within the unit. The unit is configured for providing a controlled hyperthermic conditioning environment and/or optionally a controlled hypothermic conditioning environment. The unit includes a capsule configured to provide two independently controllable environments. The capsule includes an upper body (i.e. head/neck and in some cases the upper shoulders) area which is selectively enclosable and an internal bed component adapted with various physical exercise equipment for use by a human user within the capsule. The capsule includes sources of heat including a heater and LED and/or infrared lighting and/or cooling, such as an air conditioner. The capsule may also optionally include one or more shower heads, air control, light, steam, and/or misting spray devices to provide complimentary conditions for the human user before, during or after exercise in the capsule. This is in addition to the hyperthermic conditioning environment and optionally the hypothermic conditioning environment.

The personal capsule includes a base supporting a bed and has a movable cover adapted with a pop-up translucent hood and dome. The cover, and hood and dome are selectively closeable to separate an upper body, or head chamber from a main body chamber, wherein an environment of both chambers is selectively controllable. The main body chamber comprises the bed, which may be a fitness or exercise bed configured to receive a person lying down and adapted with connections for various exercise equipment such that the user is able to utilize the exercise equipment within the bed and thus within the capsule. The various exercise equipment may be positioned in, on, or around the perimeter of the bed at selected locations appropriate for the specific use of the equipment by the user. For example, the individual pieces of exercise equipment are positioned within reach of the user's hands or feet within the capsule.

The movable cover and pop-up hood and dome are configured to allow the upper body area and the main body area to be one continuous chamber having a selectively controllable environment, or to be two individual and adjacent chambers, each having a separately controllable environment. The bed and cover combine to provide a personal compartment having a controllable internal environment, where for example, the temperature and humidity of the environment can be selected and controlled to provide a controllable hyperthermic or hypothermic conditioning environment for the user. However, the capsule allows the user to select a single (the same) environment for their entire body or select an environment for their head and face that is different than the environment for the user's body. For example, misting may be including one or both chambers and/or the chambers may have varying humidity levels or temperatures.

The capsule is of dimensions sufficiently large to allow the user to move within the personal compartment when utilizing the various exercise equipment therein or partially therein.

Infrared heaters or dry heat sources are also be provided along the internal sides of the cover to direct heat onto the person lying on the bed.

Exercise resistance bands are also provided and are attached along the sides of the bed. The resistance bands can be utilized to provide resistance training and physical exercise to the person within the capsule. The bands can be used when heat is directed down onto the person lying on the bed, and/or when the temperature of the compartment is elevated.

The device may include a stack of weights that are coupled to hand or foot grips with a cable. The stack of weights allow for resistant weight training within the thermally controlled environment. The stack of weight can be located within the capsule or external to the capsule while the hand or foot grips are located within the capsule.

A push pedal stepper system or a stationary cycle may also be provided and attached to the foot area of the bed. The push pedal stepper system or the stationary cycle can be utilized to provide resistance movement and physical exercise to the lower body and legs of the person within the capsule. The stepper system or the stationery cycle can be used when heat or cooling is directed down onto the person lying on the bed, and/or when the temperature of the compartment is elevated or depressed.

Hand stirrups or other handles may also be provided and attached along the sides of the bed. The hand stirrups can be utilized to provide isometric exercise options, including allowing the person within the capsule and lying in the bed to do stomach crunches, core workouts, sit-up, pull-ups and/or shoulder shrugs. The hand stirrups can be used when heat or cooling is directed onto the person lying on the bed, and/or when the temperature of the compartment is elevated.

A removable pull up bar may also be provided and attached over the open hood area of the cover. The pull up bar allows the person within the capsule to do upper body strength exercises such as pull-ups, curls and/or other strength training. The pull up bar can be used when heat is directed down onto the person lying on the bed, and/or when the temperature of the compartment is elevated.

Directed air flow is also provided near the shoulder portion of the bed area for preventing heat loss in the personal compartment when the user selects to open, or pop up, the hood and dome portion of the cover. This allows the conditions within the personal compartment to be controlled or substantially maintained while allowing the user to expose their head and face to the outside or ambient environment.

Additional exercise equipment such as, but not limited to, stretching bands and/or cords, free weights and/or wrist or ankle weights may also be provided in the bed portion.

DETAILED DESCRIPTION

Figure 1:
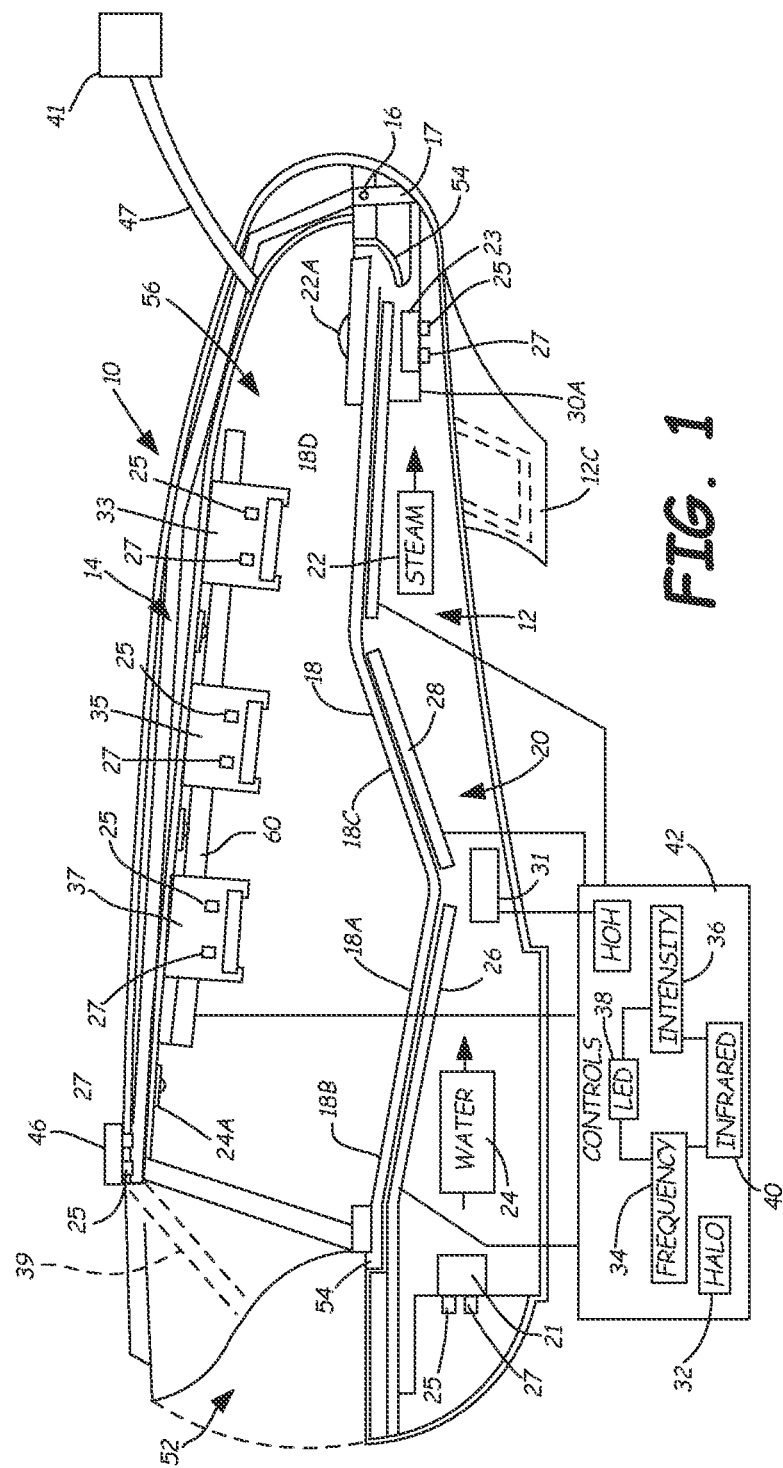
FIG. 1 is a sectional view of a conditioning capsule with a hood in a closed position.
Figure 2:
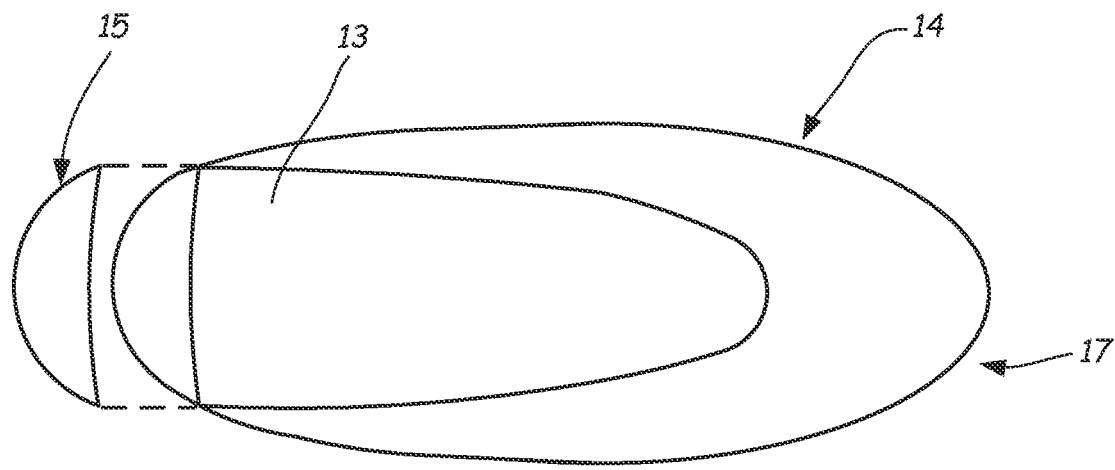
FIG. 2 is a bottom view of the capsule.

A conditioning unit 10 is illustrated generally in the figures. Referring to FIG. 1, a full body compartment assembly is generated at 10 in cross-section, to show an interior cavity 11 of the conditioning unit 10. The conditioning unit 10 includes a base compartment 12 and a cover 14. The cover 14 is operably secured to the base compartment 12 by a hinged connection at a hinge axis 16. The hinge axis 16 can be positioned at the foot end 17 of the base compartment 12. Alternatively, the hinge axis 16 can be positioned along a side length of the base compartment 12. The base compartment 12 is supported on a leg system, such as a three-point leg system preferably including a pedestal 12A, and forward legs 12C as illustrated in FIG. 2.

The three-legged arrangement provides stability of support without rocking or problems with unevenness of a support floor. Other forms of support for the base can be utilized and are contemplated.

The base 12 is provided with a bed 18 therein which can be constructed of a clear acrylic or other clear plastic material, so that it may be transparent to light of different wavelengths. Upper surfaces 18A of the bed 18 are positioned at various angles and the bed 18 includes an upper body portion 18B that supports the shoulder and upper back region of a person lying on the bed 18. The bed 18 also includes a lower back panel or portion 18C, that is at a comfortable angle relative to the upper body portion 18B, and a leg panel or support 18D that is at the foot end 17 of the bed 18.

Schematically represented at 54 are brackets for holding the bed panel 18 in position relative to the base 12. These mounts can be of any desired type.

The base compartment 12 includes a lower compartment 20 that can house various components for selecting the environment conditions within the unit 10. The lower compartment 20 can operably house components including but not limited to a steam generator 22 that is mounted to provide for steam therapy, if desired, through steam outlets represented generally at 22A. The compartment 20 also can hold a water tank 24 having a pump and supply lines connected to showerheads 24A. By way of example, a showerhead 24A is shown in the cover 14 in FIG. 1. The showing of the shower head is not limited to any particular placement. If desired, showerheads can be placed in other locations along the sides of the cover or in the base. Suitable drainage troughs will be provided and this can easily be done because the base 12 is made generally of molded plastic or fiberglass material that can be shaped as desired.

The lower compartment 20 may also house a plurality of salt blocks 21. Additional salt blocks 21 may be positioned on an inner surface of the cover 14. Each block 21 will have corresponding LED clusters 25 and infrared bulbs 27 to provide supplemental energy to the salt blocks in addition to heat provided by a heater 31.

The base 12, bed 18 and cover 14 form an open interior space referred to as a personal compartment 11. The bed 18 is a user platform within the personal compartment 11. The personal compartment 11 is configured to receive a human user and to allow the user to lie on the bed 18 while also allowing sufficient space for the user to move, such as sit up, move arms and/or legs within the personal compartment when utilizing various physical exercise equipment.

The personal compartment 11 is temperature controlled and is thus a heated or cooled personal compartment 11. What is meant by hyperthermic in this disclosure is that hot air can be introduced to the compartment 11 to elevate the temperature within the compartment, thus elevating the body temperature of the user therein. Conversely, what is meant by hypothermic in this disclosure is that cool air can be introduced into the compartment 11 to reduce the temperature within the compartment 11, thus lowering the body temperature of the user therein.

The personal compartment 11 is configured to provide a first controlled environment, which substantially covers the user's main body (for example, depending on user size, covering shoulders to feet) and is also referred to as a body chamber 56. The personal compartment 11 incorporates various fitness and rehabilitation exercise apparatuses, and/or electrical exercise stimulation devices, inside the controllable temperature body chamber 56. As discussed herein, the temperature may be elevated or reduced (cooled chamber) for relief or various therapies and the temperature may be manipulated and controlled by convection, radiance or conduction means.

Figure 3:
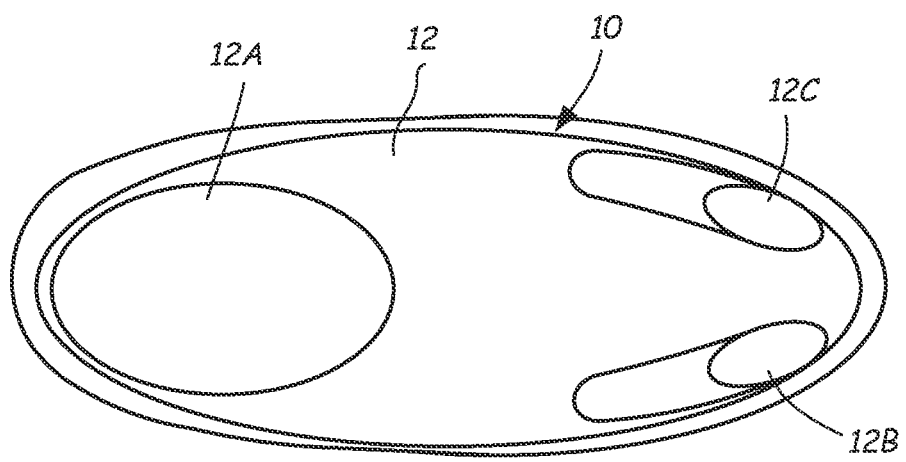
FIG. 3 is a top view of the capsule with the hood in the closed position.
Figure 4:
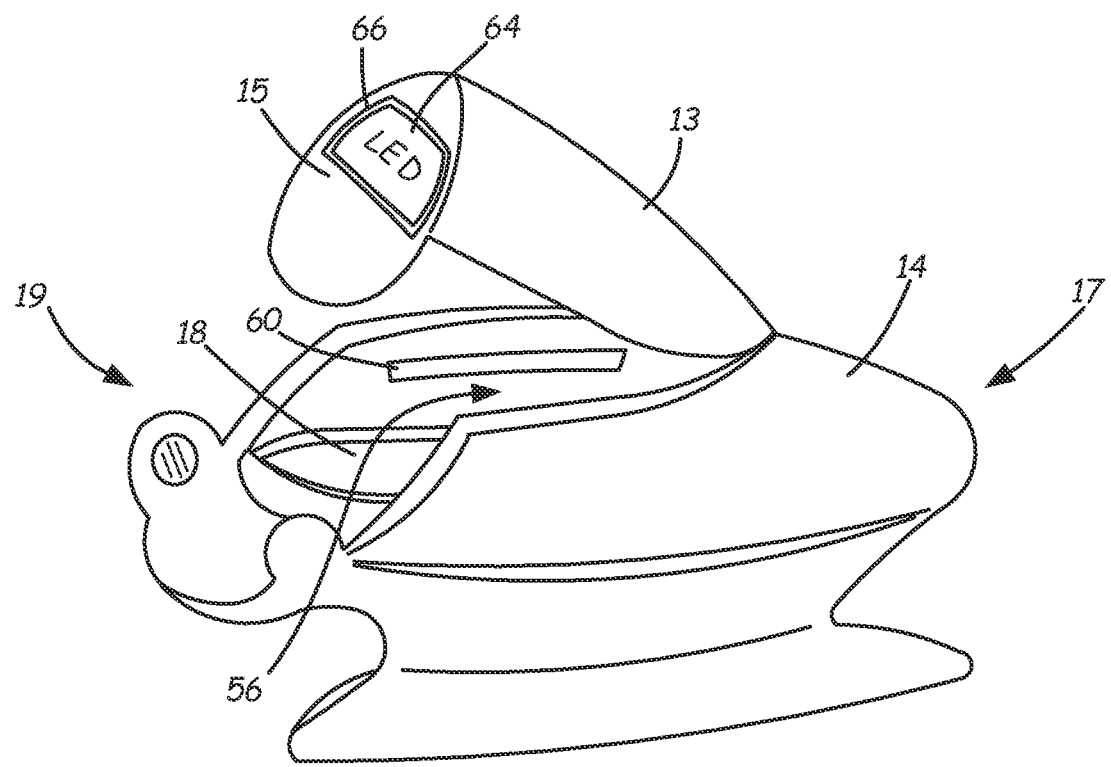
FIG. 4 is a side perspective view of the capsule with an open hood section.
Figure 5:
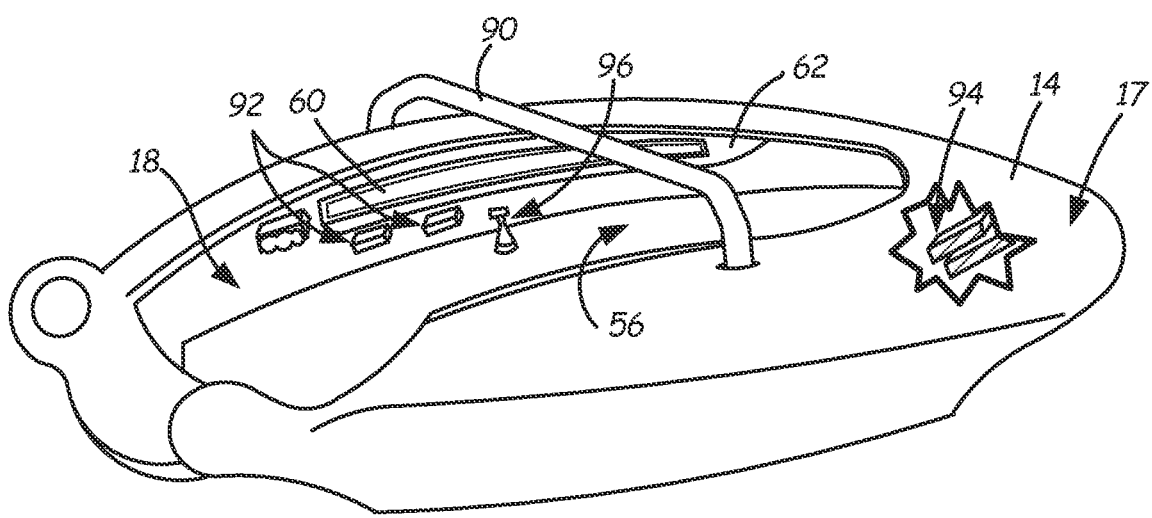
FIG. 5 is a side perspective view of a bed and cover portion of the capsule in an open position where the hood and dome section are removed.

As illustrated in FIGS. 3-5, the cover 14 can be further adapted with a pop-up hood 13 and dome 15. The dome 15 may be made of a translucent or transparent acrylic or other plastic material. The hood 13 and dome 15 are removable, but when in use are portions that extend along a width and a length of an opening in the upper surface of the cover 14. The dome 15 is positioned near the head end 19 of the capsule with the hood 13 extending from the dome 15 towards the foot end 17 of the capsule. The hood 13 can be pivotally connected to the cover 14 at one or more points along the opening or can otherwise be removable and selectively secured to enclose the capsule and the personal compartment 11.

The hood 13 allows the user to open an upper portion 50 of the cover 14 to further open up or enlarge the personal compartment 11. The dome 15, which is also removably secured to the head end 19 of the hood 13 and/or cover 14 is further removable to allow the user to select whether their head and face is covered within the personal compartment 11 or uncovered and exposed to the ambient environment.

The hood 13 and dome 15 may also provide a separate head chamber 52 to the personal compartment 11. As the face of the user (head and neck) generally extends beyond or outside of the open interior space that is the body chamber 56 of the personal compartment 11, the hood 13 and dome 15 are configured to enclose the upper portion 50 as a second separate personal compartment also referred to as the head chamber 52. The head chamber 52 is also configured such that the user can selectively control the environment in the head chamber 52, including for example humidity and temperature.

The dome 15 is closeable to thereby isolate the upper portion 50 from the main body of the personal compartment 11. Thus, the upper portion 50, or head chamber 52, can also be environmentally controlled for temperature (hot or cold) by any temperature control methods described herein or otherwise capable of heating and/or cooling the capsule. Further, the head chamber 52 is also configured with controllable air content (hypo or hyper enriched oxygen, aromas, medical gases, etc.). The environment of the head chamber 52 may be configured with combinations of controllable features also including, but not limited to, humidity, light control or electrical impulse stimulation and/or media stimulation, all of which can be controlled independently from the same or similar controllable features of the body chamber 56 of the personal compartment 11.

As illustrated in FIGS. 4 and 5, removal of the hood 13 allows the upper portion 50 of cover 14 to be opened for additional exercise space. For example, a removable pull up bar 90 may be secured to the capsule cover 14. The removable pull up bar 90 extends across the upper portion 50 of the cover 14, allowing the user additional space and access to the pull up bar 90 from within the personal compartment. The removable pull up bar 90 may be provided and attached over the open area of the upper portion 50 by way of suitable fasteners. Examples of suitable fasteners include but are not limited to bolts, hooks and/or clamps. The pull up bar 90 allows the person within the capsule to perform upper body strength exercises such as pull-ups, curl ups and/or other strength training. The pull up bar 90 can be used when heat is directed down onto the person lying on the bed 18, and/or when the temperature of the compartment is elevated.

Figure 6:
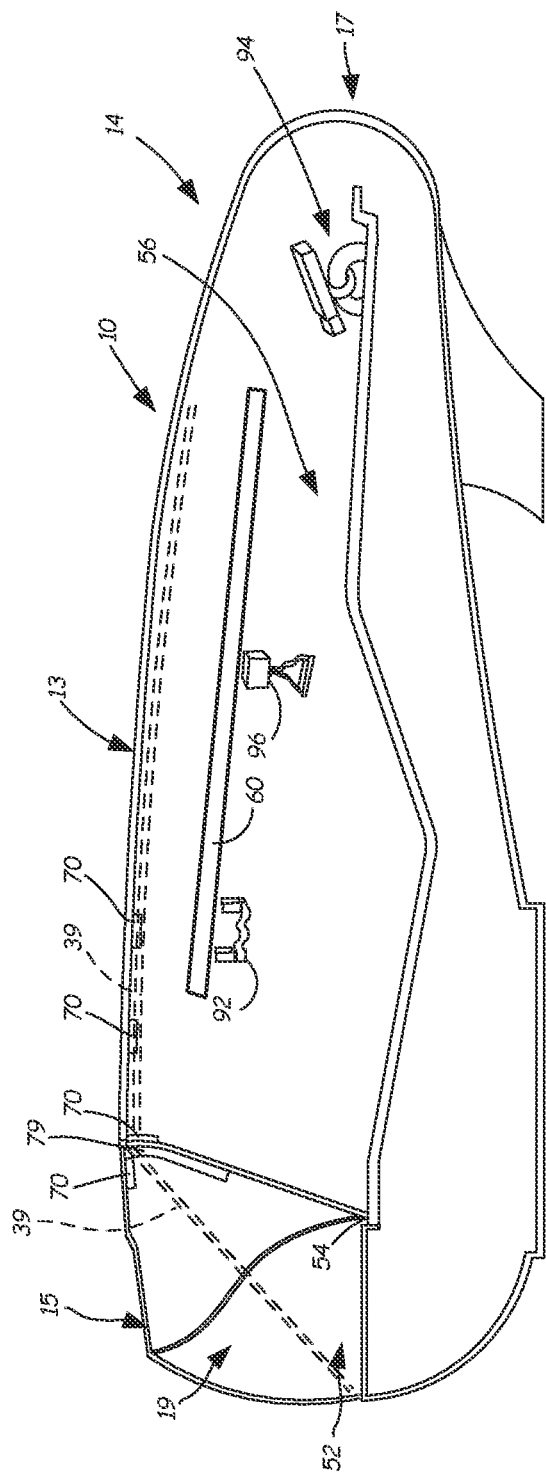
FIG. 6 is a simplified sectional view of the conditioning capsule in a closed view to show conditioning equipment within the capsule.

As illustrated in FIG. 6, various types of exercise equipment, such as resistance equipment such as a recumbent stationary cycling device and/or weights may be installed along the bed 18 and/or inner surface of the cover 14 to provide the personal compartment 11 with exercise equipment therein.

One or more exercise resistance bands 92 are also provided and are attached along the sides of the bed within the capsule. The one or more bands 92 may be usably secured to the sides of the bed, or alternatively to the inside surface of the cover 14. The bed 18 and/or cover 14 are configured for securely receiving the bands 92 in one or more spaces adapted for securing the bands 92 to the bed 18 and/or cover 14 by way of suitable fasteners, examples of which include but are not limited to, bolts, hooks, carabiners, or clamps. The bands 92 are positioned such that a user within the capsule may access, reach and use the bands for stretching and/or strength training. The bands 92 can be used when heat is directed down onto the person lying on the bed 18, and/or when the temperature of the compartment is elevated and/or maintained.

A push-pedal stepper system 94 may also be provided in the foot end 17 of the bed 18. The bed 18 is configured with a space for securably receiving a push-pedal stepper system 94 generally indicated in FIGS. 5 and 6, the stepper system 94 may be usably secured using one or more suitable fasteners or clamps in the foot end 17 of the bed 18. The push-pedal stepper system 94 can be utilized to provide resistance movement and physical exercise to the lower body and legs of the person within the capsule. The stepper system 94 is usably secured to the bed 18 and is oriented for use when the user is sitting or lying down. That is, the stepper system 94 can be used when the personal compartment is enclosed, the hood 13 is secured to the cover 14 or when the compartment is opened removing the hood 13 and dome 15. The stepper system 94 can be used when heat is directed down onto the person lying on the bed 18, and/or when the temperature of the compartment 11 is elevated and/or maintained.

Hand stirrups 96 or other handles may also be provided and usably secured along both sides of the bed 18 or along the inner surface of the cover 14. The bed 18 and/or cover 14 are configured for securely receiving hand stirrups 96 or other handles by way of suitable fasteners, examples of which include but are not limited to, bolts, hooks, carabiners, or clamps The hand stirrups 96 can be utilized to provide isometric exercise options, including allowing the person within the capsule and lying in the bed to do stomach crunches, core workouts, sit-up, pull-ups and/or shoulder shrugs. The hand stirrups can be used when heat is directed down onto the person lying on the bed, and/or when the temperature of the compartment is elevated.

The capsule may also include a system configured for feedback monitoring. Appropriate sensors may be incorporated into either the head chamber 52, the body chamber 56 or both to sense user conditions including, but not limited to, heart rate, blood oxygen content, blood pressure, body temperature, chamber temperature and/or chamber atmospheric content. Further sensors may also be incorporated to monitor and provide exercise apparatus feedback such as reps, resistance, pounds and/or range of motion. The individual sensors may be in wired or wireless connection with a monitor and/or display system positioned adjacent to or outside of the chamber or in or on display panels near the upper portion 50 of the capsule.

Referring back to FIG. 1, the cover 14 is shown as supporting a light panel assembly 60 on the upper portions of the cover 14 in a suitable manner, and which contains myriad of LEDs or infrared lights forming light arrays. The light arrays may be tailored for providing colored lights and/or heating the personal compartment of the capsule.

A tunnel member 62 has light panels positioned along its length. If desired, the tunnel member 62 can carry heated air. An array 60 of LEDs or other lights extends along one or both side lengths of the cover such that the length and width of the LED panel can be made as desired and then supported on the interior upper sides of the cover 14. The infrared light sources can be small bulbs arranged in an array, or larger forms as desired. Infrared light arrays for heat therapy may be directed along the shoulders, along the buttock or back portions, or other areas of the bed as positioned within the capsule.

The cover 14 not only also supports the removable hood 13 and dome 15, but may also support showerheads and/or steam outlets 24A. Steam outlets 24A are illustrated at the forward end of the unit and these can be placed at any desired location. The dome 15 has a panel 64 provided at the head end 19, and this includes the region 66 for supporting a control panel display for the controls shown schematically at 42. The bed 18 provides a recessed area at 68 to permit the neck of the person lying in the compartment to cross the bed 18 so the user's head is positioned under the optional dome 15 and thus to the exterior of the personal compartment.

The capsule also includes an air stream 39 that forces air onto the person's face when within the personal compartment 11 and when the dome 15 is positioned on the cover 14 to enclose the user. Also, oxygen can be injected into the capsule to raise the oxygen concentration within the personal compartment 11.

A water tank 24 can be used for providing a humidifying vaporization and/or misting system through the outlets shown at 24. This system can also be used to allow the application and spray or envelopment of the body of the user of different solutions that are photosensitive and/or photoactive for different therapies. Photosensitive agents can be placed in the tank 24 and then misted onto the body of a person on the bed at desired times.

A facial panel 79 supports an array of a plurality of LEDs. This facial panel 79 can be suspended on or from the hood 13 or dome 15, or adjacent the panel 64. The facial panel 79 can also include adjustable LEDs, of various colors as outlined, and can include infrared lights as well.

Further, directed air provides a curtain along the opening of the cover 14 where the hood 13 and dome 15 are removed. Directed air, by way of air knives or other vents 70 allows for maintaining conditions within the bed 18 when the hood 13 and/or dome 15 is removed or open such that the user's head and face and/or upper body are exposed (for example, the hood 13 and dome 15 are removed when using the removable pull up bar 90). The air flow may be directed by air knives 70 in the sides of the cover proximate the opening and/or other air knives or vents 70 positioned to direct air flow across the neck opening of the personal compartment to prevent significant heat and/or moisture loss in the capsule. The air knives or vents may also be used when the dome 15 is removed but the hood 13 is in use on the cover 14. These air knives are directed to provide a curtain around the user's neck for maintaining the environmental conditions in the otherwise enclosed capsule.

Alternatively, when the cover 14 is positioned on the capsule and the hood 13 and dome 15 are secured on the upper portion 50, the capsule effectively provides two adjacent independently controllable environments. As the user's body extends from the head chamber 52 to the body chamber 56, a panel may extend into the capsule between chambers to further separate the individual environments, where this panel may be configured with a shape to close off the two chambers while allowing the person's neck or shoulders to pass through the area where the two chambers meet. This panel may be comprised of translucent plastic or other lightweight materials to maintain the adjacent independent environments. Additionally, the directed air by way of air knives or other vents 70 also allows for further maintaining of the environments when the hood 13 and dome 15 are closed such that head chamber 52 and body chamber 56 have separate environments that may be independently controlled.

Figure 7:
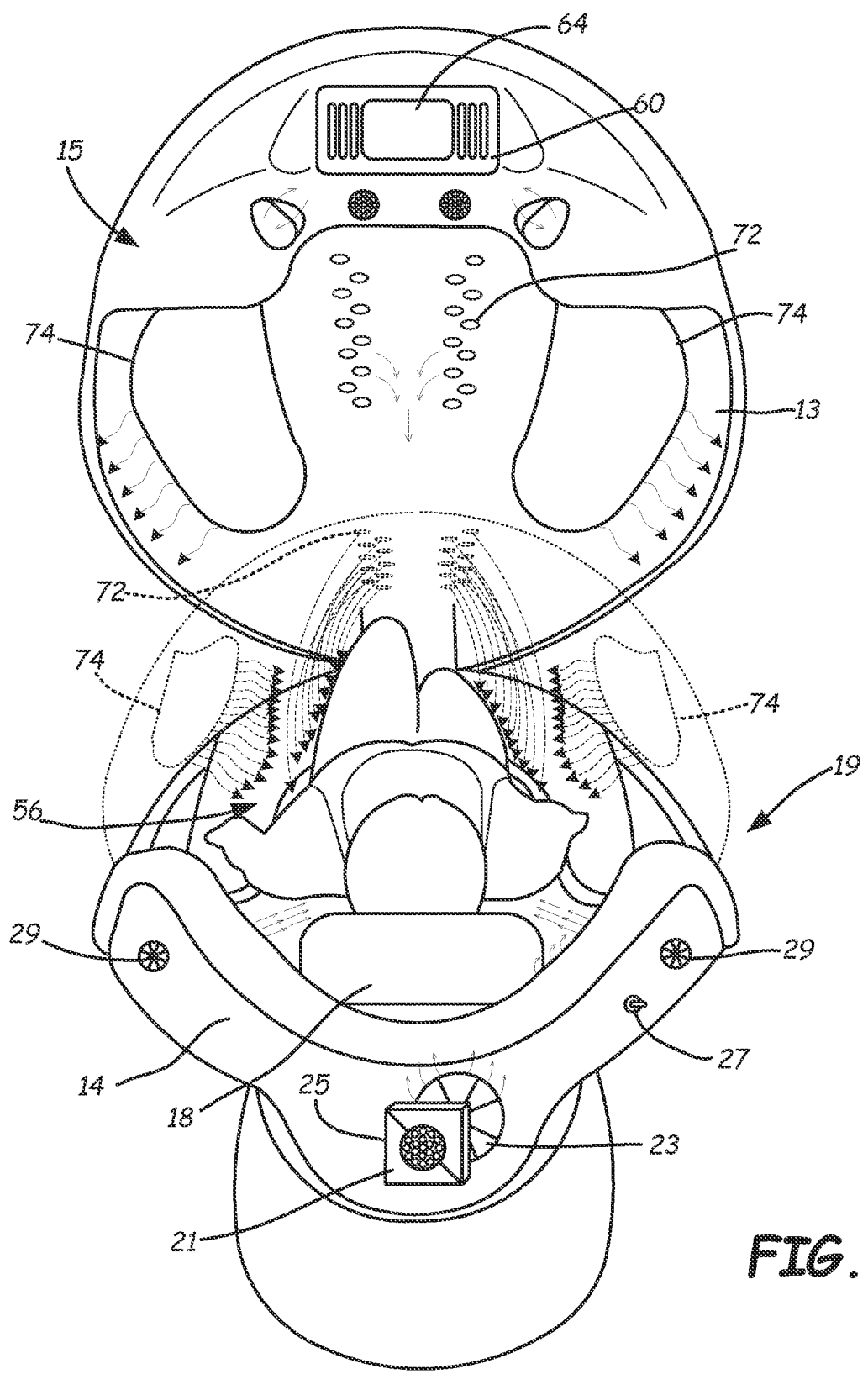
FIG. 7 is a front view of an embodiment of the capsule showing both the cover in an open and closed position.

FIG. 7 illustrates an additional arrangement of elements described herein. The elements described herein can be combined in any manner and elements described in reference to FIGS. 1-6 can be combined with elements or arrangements described in reference to FIG. 7 or vice versa.

FIG. 7 shows the infrared emitters 74 which are positioned on the cover section 14 and provide light therapy and additional controllable heat therapy. The personal compartment 11 can also be equipped with one or more ports 72 which provide dry heat to the body chamber 56 and/or head chamber 52 for controlling the temperature and humidity in the personal compartment 11. The chamber 11 can be heated using convection technology to provide circulating dry heat within the personal compartment 11. Additionally or alternatively, infrared radiation through emitters 74 can be used for heating the personal compartment 11. The personal compartment 11 can be heated in a dual manner.

The personal compartment 11 is further configured controlled environmental conditions by way of one or more cooling fans 29 positioned for directing cooled air towards the head chamber 52 to cool the user's face. Further, purified air can be directed into the personal compartment by a purified fresh air intake fan 23 held in the base 12 or operably secured in the base compartment 20. Pure oxygen can also be provided to the personal compartment 11 or head chamber 52 to assist the user when utilizing exercise equipment in the personal compartment 11.

In addition to providing an environment for hyperthermic conditioning, the capsule 10 can also provide other therapies, such as light therapy. This therapy can be provided by the transparent bed 18 on which a person can lie, in connection with LED lights and infrared light sources comprising small bulbs mounted in an array on a light support panel 26 for the upper back portion of the bed. A light support panel 28 is provided for the lower back, immediately below the lower back panel 18C of the bed, and a pair of leg light panels 30A and 30B are provided (see FIG. 3) that are individually controlled so that one leg or the other or both can be provided with light therapy through the transparent bed which is represented in FIG. 3 by the outline.

In some embodiments, the temperature in the body chamber 56 can be varied by the controller to correspond the temperature with a training routine. For instance, in some routines an elevated temperature body chamber 56 provides beneficial effects as the person exercises. This phenomenon is referred to as hyperthermic training. While the body chamber 56 is at an elevated temperature, the head chamber 52 can be either heated or cooled to provide the desired effects to the head, neck and shoulder region. After the portion of the routine is completed, the person may rest, and the temperature in the body chamber 56 may be lowered to provide cooling.

The temperature of the head chamber 52 can also be adjusted as the temperature of the body chamber 56 is lowered. In some instances, the temperature in the head chamber 52 tracks with the temperature in the body chamber 56. In other instances, the temperature in the head chamber 52 is controlled opposite that of the body chamber 56, meaning if the temperature in the body chamber 56 is elevated, the temperature in the head chamber 52 is suppressed, and vise versa.

In other programs, the temperature in the head chamber 52 and the body chamber 56 track each other, meaning the temperatures rise and fall together. However, the chambers 52 and 56 may be at different temperatures or the same temperature.

In some instances, the body chamber 56 is elevated when the user is exercising to provide hyperthermic conditioning. When the user is not exercising, the temperature in the body chamber 56 may be reduced and is re-elevated as the user exercises. The cycling of the temperature is controlled by a control, where the routine may be preprogrammed or manually controlled by the user.

In other alternatives, hypothermic conditioning may be utilized where cooling is supplied to the body chamber 56 as the user exercises. The head chamber 52 can be cooled or heated, depending upon the desired effect. The user can cycle the temperature for hypothermic conditioning similar to that described with respect to hyperthermic conditioning where the head chamber 52 and the body chamber 56 may be cycled together or inversely.

Additional features such as dry heat air, steam, ceramic and/or course midrange and far-range infrared heaters can be added in the cover. A mist source, a shower, a humidifier, a hydrotherapy source, electrical stimulation and various entertainment sources can be used. Entertainment sources include, without limitation, DVD players, music sources and the like. These features can be selectively applied to either or both the head chamber and the body chamber, separately or concurrently as each of the head chamber and body chamber environments can be independently selected.

Although the present invention has been described with reference to preferred embodiments, workers skilled in the art will recognize that changes may be made in form and detail without departing from the spirit and scope of the invention.

What is claimed is:

1. A method of conditioning comprising:
   providing a capsule comprising:
      a base supporting a bed; and
      a top hingedly connected to the base;
   after a human being at least partially lies on the bed, positioning the top into a closed position to provide a first substantially enclosed space for a body of the human being and a second space for a head of the human being;
   monitoring at least one biometric variable of the human being as the human being exercises;
   controlling an environmental temperature of the first substantially enclosed space with one or more heating elements to elevate the environmental temperature within the enclosed space to a temperature which elevates a body temperature of the human being while exercising to provide hyperthermic conditioning within the first substantially enclosed space; and
   directing cooled air towards the body of the human being after hyperthermic conditioning within the first substantially enclosed space to reduce the body temperature of the human being.

2. The method of claim 1 and further modifying the environment within the substantially enclosed space by activating one or more of a cooling air fan, a pure oxygen flow, vibration and/or LED lights emitting wavelengths in a visible light spectrum.

3. The method of claim 1, wherein the first substantially enclosed space is heated to the elevated environmental temperature with heated air.

4. The method of claim 1, wherein the first substantially enclosed space is heated to the elevated environmental temperature with infrared energy.

5. The method of claim 1, wherein the first substantially enclosed space is cycled between the elevated environmental temperature to cause the body temperature of the human being to elevate to cause hyperthermic conditioning to a cooler environmental temperature wherein the body temperature of the human being is decreased such that hyperthermic conditioning ceases.

6. The method of claim 1, wherein the at least one biometric variable comprises a body temperature of the human being.

7. The method of claim 1, wherein the at least one biometric variable comprises heart rate, blood oxygen content and/or blood pressure.

8. The method of claim 1, and further comprising emitting light in a visible spectrum within the first substantially enclosed space to provide phototherapy as the human being exercises.

9. The method of claim 1, and further comprising utilizing salt blocks within the substantially enclosed space.

10. The method of claim 1, and further comprising infusing aroma or concentrated oxygen into the substantially enclosed space as the human being exercises.

11. A method of controlling an environment while a human being is exercising, the method comprising:
    providing a capsule comprising:
       a base supporting a bed; and
       a top hingedly attached to the base;
    after a human being is laying on the bed, positioning the top into a closed position to provide a first substantially enclosed space for at least a body of the human being and a second environment about a head of the human being, the second environment separate from the first substantially enclosed space;
    as the human being is exercising while lying on the bed in the enclosed space, monitoring at least one biometric variable of the human being;
    heating the first substantially enclosed space to an elevated temperature such that a body temperature of the human being is elevated to provide hyperthermic conditioning within the substantially enclosed space;
    directing cooled air toward the body of the human being after hyperthermic conditioning within the first substantially enclosed space to reduce the body temperature of the human being; and
    monitoring the at least one biometric variable to provide feedback as the human being exercises.

12. The method of claim 11, wherein the first substantially enclosed space is heated to the elevated temperature with heated air.

13. The method of claim 11, wherein the first substantially enclosed space is heated with infrared energy.

14. The method of claim 11, wherein the first substantially enclosed space is cycled between the elevated temperature to cause the body temperature of the human being to elevate to cause hyperthermic conditioning to a cooler temperature wherein the body temperature of the human being is decreased such that hyperthermic conditioning ceases.

15. The method of claim 11, wherein the at least one biometric variable comprises body temperature, heart rate, blood oxygen content and/or blood pressure.

16. The method of claim 1, wherein the second space is substantially enclosed.

17. The method of claim 1, wherein the environment in the second space is heated with hot air or cooled with chilled air.

18. The method of claim 1, wherein the environment in the second space is controlled to introduce enriched oxygen, aromas, light, humidity and/or electrical impulses.

19. The method of claim 5, wherein the environment in the second space is heated as the environmental temperature in the first substantially closed space is heated and the environment in the second space is cooled as the environmental temperature in the first substantially closed space is cooled.

20. The method of claim 5, wherein the environment in the second space is cooled as the environmental temperature in the first substantially closed space is heated and the environment in the second space is heated as the environmental temperature in the first substantially closed space is cooled.

21. The method of claim 11, wherein the second environment is substantially enclosed.

22. The method of claim 11, wherein the second environment is heated with hot air or cooled with chilled air.

23. The method of claim 11, wherein the second environment is controlled to introduce enriched oxygen, aromas, light, humidity and/or electrical impulses.

24. A method of controlling an environment while a human being is exercising, the method comprising:
   providing a capsule comprising:
      a base supporting a bed; and
      a top hingedly attached to the base;
   after a human being is laying on the bed, positioning the top into a closed position to provide a first substantially enclosed space for at least a body of the human being and a second environment about a head of the human being, the second environment separate from the first substantially enclosed space;
   as the human being is exercising while lying on the bed in the enclosed space, monitoring at least one biometric variable of the human being;
   heating the first substantially enclosed space to an elevated temperature such that a body temperature of the human being is elevated to provide hyperthermic conditioning within the substantially enclosed space, wherein the first substantially enclosed space is cycled between the elevated environmental temperature to cause the body temperature of the human being to elevate to cause hyperthermic conditioning to a cooler environmental temperature wherein the body temperature of the human being is decreased such that hyperthermic conditioning ceases; and
   monitoring the at least one biometric variable to provide feedback as the human being exercises.

25. The method of claim 24, and further comprising heating the second environment as the environmental temperature in the first substantially closed space is heated and cooling the second environment as the first environmental temperature in the substantially closed space is cooled.

26. The method of claim 24, and further comprising cooling the second environment as the environmental temperature in the first substantially closed space is heated and cooling the second environment as the environmental temperature in the first substantially closed space is cooled.

* * * * *